Feb. 15, 1927.
C. D. BOLIN
1,618,050
INCUBATOR THERMOMETER
Filed June 13, 1923
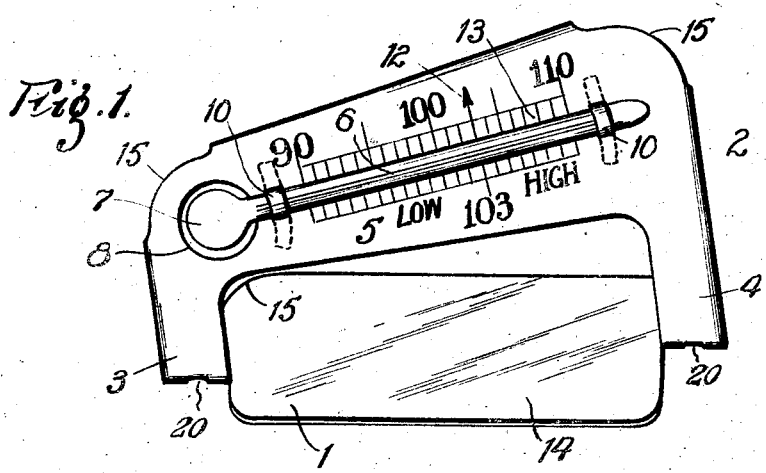
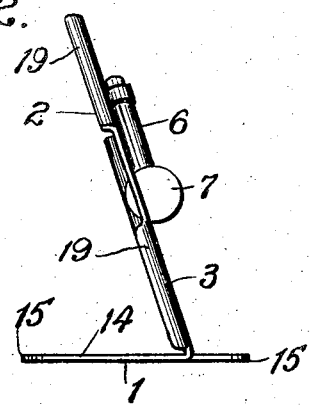
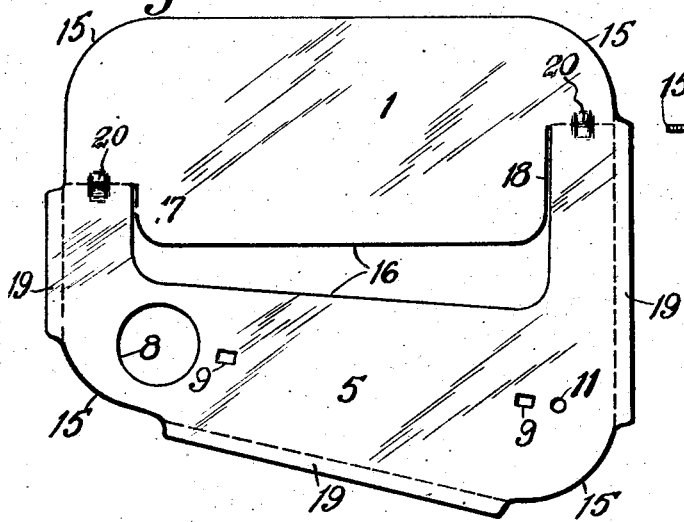
Inventor
Charles D. Bolin
By Bruce S. Elliott
Attorney Patented Feb. 15, 1927.

1,618,050

UNITED STATES PATENT OFFICE.

CHARLES D. BOLIN, OF ST. LOUIS, MISSOURI.

INCUBATOR THERMOMETER.

Application filed June 13, 1923. Serial No. 645,038.

This invention relates to thermometers for use in incubators and has for its general object to provide a thermometer of this type which is provided with its own support or base, so that it may be placed on the shelf or tray of the incubator without interfering with placing the usual number of eggs in the incubator.

A further object of the invention is to provide a thermometer of the type named, which will permit of ready reading of the temperature, as indicated by the mercury in the tube, and which will also permit of the close proximity of the thermometer bulb to at least two eggs located on either side thereof.

A further object of the invention relates to the construction of the thermometer frame or support, in a unique and highly useful shape, from a single piece of metal.

The invention is illustrated in the accompanying drawing in which—

Figure 1 is a perspective view of my improved thermometer;

Figure 2 is a view in end elevation thereof; and

Figure 3 is a plan view of a plate of metal from which the thermometer frame is made, showing the shape of the plate and the manner of cutting the same to enable it to be bent up to form the frame.

Referring now to the drawings, and especially to Figures 1 and 2, the numeral 1 indicates the base of the frame and 2, the upright portion thereof. This upright portion consists of legs or standards 3, 4, the latter being of greater length than the former, whereby to impart an upward incline to a scale plate 5 carrying the graduations indicating the degrees of temperature. Mounted on this scale plate is a thermometer tube 6 having a bulb 7, and to accommodate this bulb the scale plate is provided with an aperture 8. The scale plate is provided with small openings 9 through which the ends of soft metal bands 10 may be inserted, after the same have been caused to encircle the tube 6, after which they are separated and bent to lie flat against the rear side of the scale plate. The scale plate is further provided with a small opening 11 to accommodate the bent end or tip of the thermometer.

The temperature scale for an incubator thermometer is quite short and usually the range of temperatures indicated extends between 90 and 110 degrees, as shown. 103 being the critical temperature, the graduation indicating this temperature is conveniently prolonged into an arrow 12, with the number "103" at one end thereof, as shown in Figure 1. It is convenient to place on the left side of this arrow, the word "Low", and on the right side, the word "High", to indicate corresponding zones of temperature. In order that the temperature indicated by the thermometer may be ascertained at a glance, I preferably coat the scale plate with a light colored enamel such as porcelain or the like, and make the graduations of the scale 13, and the numbers on said scale, in black. Thus the graduations and numbers on the scale stand out prominently and form a pronounced contrast with the color of the mercury in the tube. In addition, the mercury tube 6 is of the magnifying type, such as employed in fever thermometers and, as shown by Figure 2, the upright portion of the thermometer frame is upwardly and rearwardly inclined, which for general purposes of observation, at the usual angle at which a thermometer is viewed, places the tube in the correct position to obtain the magnifying effect.

In order to give the device as a whole, a finished appearance, the corners of the plate 14 are rounded as shown at 15; and in order to strengthen the structure, the outer edge portion of the upright part of the frame between the rounded corners are preferably bent backward to form a curved flange, as more clearly indicated in Figure 2.

The manner of forming a frame from a single plate of metal will now be described, referring particularly to Figure 3. This plate is cut with a die from a sheet of metal into the shape shown, and at the same time, it is cut out longitudinally toward one edge, as indicated at 16, and slit transversely toward opposite ends, as indicated at 17, 18, the transverse slit 18 being longer than the slit 17. At the same time, the apertures in the scale plate previously referred to, are formed. In stamping the plate 14, I leave a marginal portion of metal 19 between the curved corners which are subsequently turned over to form the strengthening flanges previously referred to, and correspondingly indicated in Figure 2. At the place of bending the standards 3 and 4 upward from the base, I may indent or groove the metal, as indicated at 20, to strengthen the structure.

I claim:

1. An incubator thermometer having a flat metal base, a scale plate rigidly supported on said base at the opposite ends thereof and at a distance therefrom, said scale plate and its supports constituting a unitary structure having the same plane of projection and forming an angle to the base, and a thermometer tube supported by said scale plate.

2. An incubator thermometer having a flat metal base, a flat metal scale plate and flat metal supports for said scale plate located at opposite ends of and integral with the said base plate, said scale plate and its supports being in the same plane, said plane being inclined at an angle to said base plate, and a thermometer tube mounted on said scale plate.

3. An incubator thermometer having a flat metal base, a flat metal scale plate, and flat metal supports for said scale plate located at opposite ends of said base, said supports being of unequal length to position the scale plate in an inclined position at a distance above the base, and said scale plate and its supports being in the same plane and forming an angle to the base, and a thermometer tube supported on said scale plate.

4. An incubator thermometer having a flat metal base, a flat metal scale plate, and flat metal supports for said scale plate located at opposite ends of said base, said supports being of unequal length to position the scale plate in an inclined position at a distance above the base, and said scale plate and its supports being integral and in the same plane and forming an angle to the base, and a thermometer tube supported on said scale plate.

5. An incubator thermometer formed from a plate of metal slotted longitudinally near one edge and cut transversely at opposite ends of the slits with the cuts intersecting said slit, the outer marginal portion thus formed being bent upwardly and rearwardly at the termination of said transverse cuts to provide a base, and a scale plate located at a distance above the remainder of the plate which forms a base, and a thermometer tube mounted on said scale plate.

6. An incubator thermometer formed from a plate of metal of general rectangular shape but wider at one end than the other, and having a longitudinal slit located near one edge and intersecting transverse cuts located at opposite ends, the cut at the wider end of the plate being longer than that at the other end, and the marginal portion of the plate thus formed being bent upwardly and rearwardly at the termination of the transverse cuts to form a base, and an elevated scale plate supported thereby and upwardly inclined as respects said base and lying in a plane inclined thereto, and a thermometer tube mounted on said scale plate.

In testimony whereof, I have hereunto set my hand.

CHARLES D. BOLIN.